United States Patent
Sadiq et al.

(10) Patent No.: US 11,031,992 B2
(45) Date of Patent: *Jun. 8, 2021

(54) RECEIVE BEAM SELECTION FOR MEASURING A REFERENCE SIGNAL

(71) Applicant: QUALCOMM Incorporated, San Diego, CA (US)

(72) Inventors: Bilal Sadiq, Basking Ridge, NJ (US); Tianyang Bai, Bridgewater, NJ (US); Vasanthan Raghavan, West Windsor Township, NJ (US); Juergen Cezanne, Ocean Township, NJ (US); Pavan Kumar Vitthaladevuni, San Diego, CA (US); Alexandros Manolakos, San Diego, CA (US); Joseph Binamira Soriaga, San Diego, CA (US); Junyi Li, Chester, NJ (US); Naga Bhushan, San Diego, CA (US); Muhammad Nazmul Islam, Littleton, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,098

(22) Filed: Jun. 19, 2020

(65) Prior Publication Data
US 2020/0322034 A1 Oct. 8, 2020

Related U.S. Application Data

(63) Continuation of application No. 16/379,480, filed on Apr. 9, 2019, now Pat. No. 10,727,929.

(30) Foreign Application Priority Data

Jun. 4, 2018 (GR) .............................. 20180100241

(51) Int. Cl.
*H04B 7/08* (2006.01)
*H04W 72/08* (2009.01)
(Continued)

(52) U.S. Cl.
CPC ........... *H04B 7/088* (2013.01); *H04B 7/0417* (2013.01); *H04B 7/0857* (2013.01);
(Continued)

(58) Field of Classification Search
CPC .... H04B 7/0417; H04B 7/0695; H04B 7/088; H04B 7/0857; H04B 17/309;
(Continued)

(56) References Cited

U.S. PATENT DOCUMENTS 9,253,592 B1   2/2016 Moscovich et al.
10,727,929 B2 * 7/2020 Sadiq .................... G01S 5/0221
(Continued)

FOREIGN PATENT DOCUMENTS

| EP | 3276851 A1 | 1/2018 |
| WO | 2017177421 A1 | 10/2017 |
| WO | 2018046271 A1 | 3/2018 |

OTHER PUBLICATIONS

International Search Report and Written Opinion—PCT/US2019/026829—ISA/EPO—dated Jul. 15, 2019.

*Primary Examiner* — Siu M Lee
(74) *Attorney, Agent, or Firm* — MG-IP Law, P.C.

(57) ABSTRACT

Disclosed are techniques for receive beam selection for measuring a reference radio frequency (RF) signal. In an aspect, a first node determines a type of measurement to be performed on the reference RF signal, selects a receive beam based on the type of measurement to be performed on the reference RF signal, generates the selected receive beam, receives, from a second node, using the generated receive beam, the reference RF signal transmitted on a wireless (Continued)

channel, and performs one or more measurements on the received reference RF signal according to the type of the measurement to be performed.

40 Claims, 7 Drawing Sheets

(51) Int. Cl.
 *H04B 17/309* (2015.01)
 *H04W 24/10* (2009.01)
 *H04B 7/0417* (2017.01)

(52) U.S. Cl.
 CPC .......... *H04B 17/309* (2015.01); *H04W 24/10* (2013.01); *H04W 72/085* (2013.01)

(58) Field of Classification Search
 CPC .. H04B 17/318; H04W 72/085; H04W 24/10; H04W 64/00; H04L 5/00; G01S 1/045; G01S 1/20; G01S 5/0221; G01S 5/0273; G01S 5/10
 See application file for complete search history.

(56) References Cited

U.S. PATENT DOCUMENTS

| | | |
|---|---|---|
| 2003/0228857 A1 | 12/2003 | Maeki |
| 2016/0202344 A1 | 7/2016 | Sanderovich et al. |
| 2018/0152852 A1 | 5/2018 | Chang |
| 2019/0296817 A1* | 9/2019 | Wu .................. H04L 5/0055 |
| 2019/0372652 A1 | 12/2019 | Sadiq et al. |
| 2020/0221319 A1* | 7/2020 | Kang ................. H04W 72/046 |

* cited by examiner

RECEIVE BEAM SELECTION FOR MEASURING A REFERENCE SIGNAL

CROSS-REFERENCE TO RELATED APPLICATIONS

The present application for patent is a continuation of U.S. patent application Ser. No. 16/379,480, entitled RECEIVE BEAM SELECTION FOR MEASURING A REFERENCE SIGNAL, filed Apr. 9, 2019, which claims priority under 35 U.S.C. § 119 to Greek Patent Application No. 20180100241, entitled "RECEIVE BEAM SELECTION FOR MEASURING A REFERENCE SIGNAL," filed Jun. 4, 2018, each assigned to the assignee hereof, and expressly incorporated herein by reference in its entirety.

TECHNICAL FIELD

Various aspects described herein generally relate to wireless communication systems, and more particularly, to receive beam selection for measuring a reference signal.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station).

Where a transmitter uses beamforming to transmit RF signals, the beams of interest for data communication between the transmitter and receiver will be the beams carrying RF signals having the highest received signal strength (or highest received Signal to Noise plus Interference Ratio (SINR), for example, in the presence of a directional interfering signal). However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements and the beam with the highest received signal strength is affected by longer propagation delay, then the beam with the highest received signal strength may not be optimal for the task at hand.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for receive beam selection for measuring a reference RF signal includes determining, by a first node, a type of measurement to be performed on the reference RF signal, selecting, by the first node, a receive beam based on the type of measurement to be performed on the reference RF signal, generating, by the first node, the selected receive beam, receiving, at the first node from a second node, using the generated receive beam, the reference RF signal transmitted on a wireless channel, and performing, by the first node, one or more measurements on the received reference RF signal according to the type of the measurement to be performed.

In an aspect, an apparatus for receive beam selection for measuring a reference RF signal includes at least one processor of a first node configured to: determine a type of measurement to be performed on the reference RF signal, and select a receive beam based on the type of measurement to be performed on the reference RF signal, and a receiver of the first node configured to: generate the selected receive beam, receive, from a second node, using the generated receive beam, the reference RF signal transmitted on a wireless channel, and perform one or more measurements on the received reference RF signal according to the type of the measurement to be performed.

In an aspect, an apparatus for receive beam selection for measuring a reference RF signal includes means for determining a type of measurement to be performed on the reference RF signal, means for selecting a receive beam based on the type of measurement to be performed on the reference RF signal, means for generating the selected receive beam, means for receiving, from a transmitter node, using the generated receive beam, the reference RF signal transmitted on a wireless channel, and means for performing one or more measurements on the received reference RF signal according to the type of the measurement to be performed.

In an aspect, a non-transitory computer-readable medium storing computer-executable instructions for receive beam selection for measuring a reference RF signal includes computer-executable instructions comprising at least one instruction instructing a first node to determine a type of measurement to be performed on the reference RF signal, at least one instruction instructing the first node to select a receive beam based on the type of measurement to be performed on the reference RF signal, at least one instruction instructing the first node to generate the selected receive beam, at least one instruction instructing the first node to receive, from a second node, using the generated receive beam, the reference RF signal transmitted on a wireless channel, and at least one instruction instructing the first node to perform one or more measurements on the received reference RF signal according to the type of the measurement to be performed.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
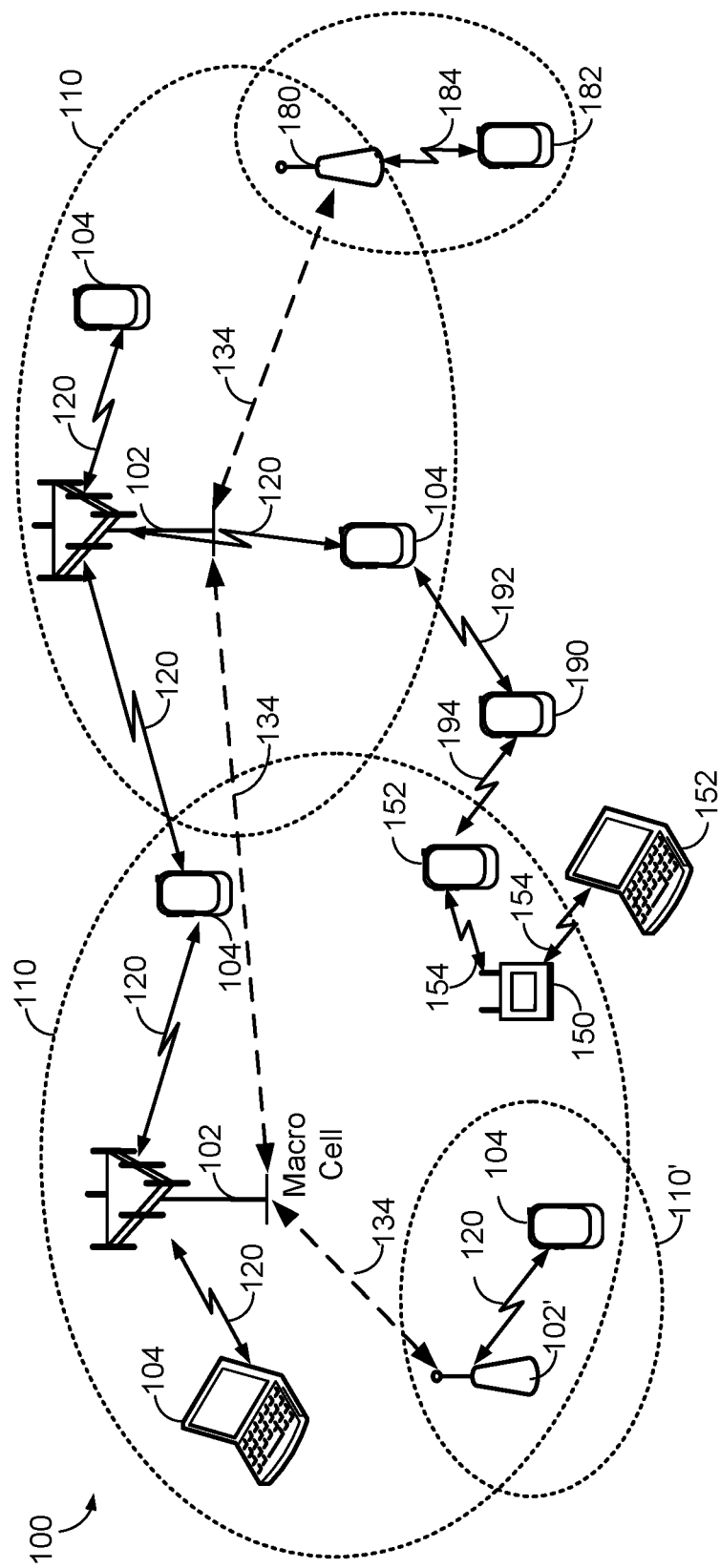
FIG. 1 illustrates an exemplary wireless communications system, according to various aspects.

Various aspects described herein generally relate to wireless communication systems, and more particularly, to receive beam selection for measuring a reference signal. In an aspect, a method for beam selection for measuring a reference signal includes determining, by a first node, a type of measurement to be performed on a reference RF signal, selecting, by the first node, a receive beam based on the type of measurement to be performed on the reference RF signal, generating, by the first node, the selected receive beam, receiving, at the first node from a second node, using the generated receive beam, the reference RF signal transmitted on a wireless channel, and performing, by the first node, one or more measurements on the received reference RF signal according to the type of the measurement to be performed.

These and other aspects are disclosed in the following description and related drawings to show specific examples relating to exemplary aspects of the disclosure. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile device that can receive wireless communication and/or navigation signals. These terms are also intended to include devices that communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a RAN and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group of users/subscribers known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a WLAN access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 (e.g., a gNB) that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as millimeter waves. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
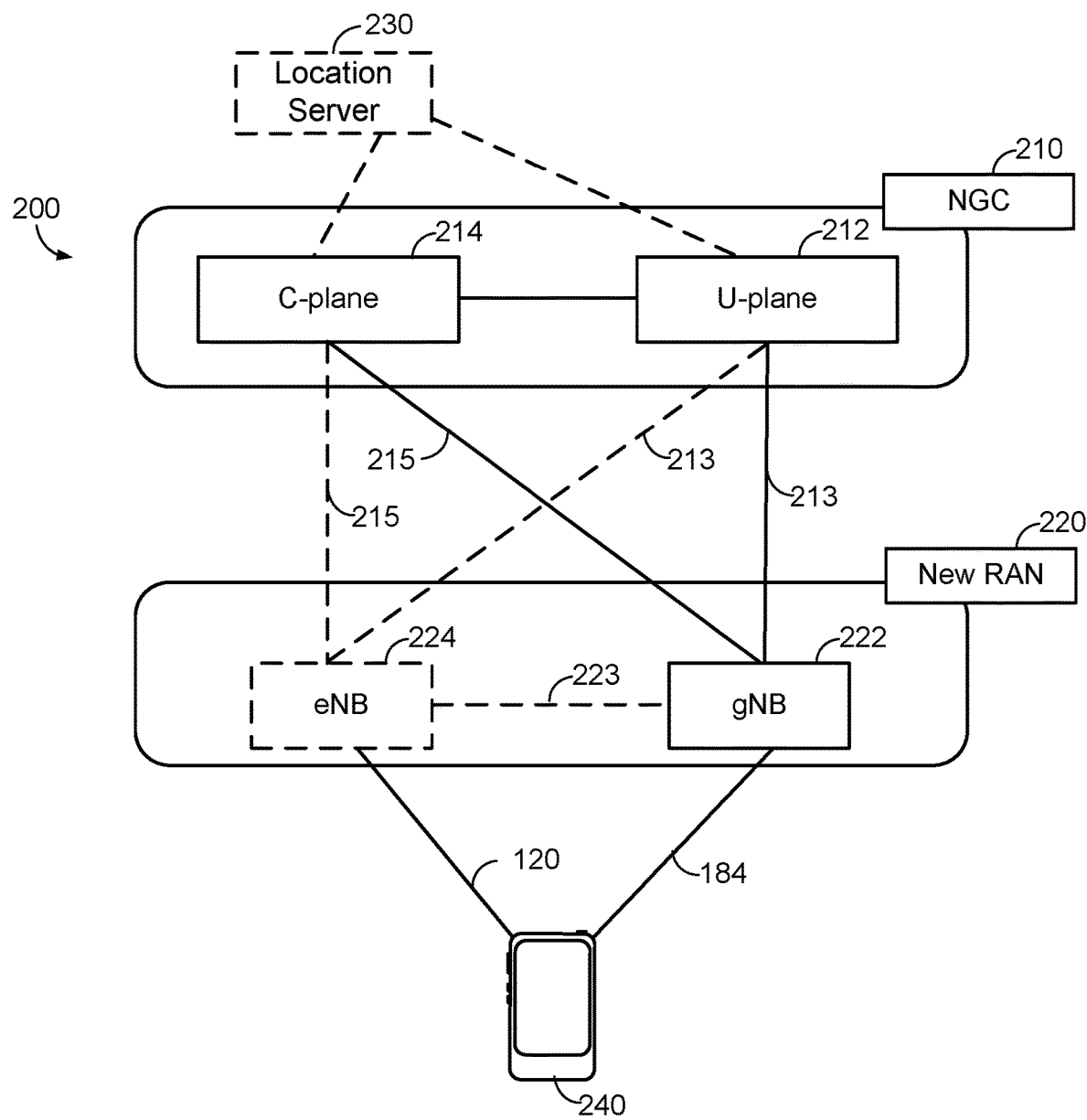
FIGS. 2A and 2B illustrate example wireless network structures, according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include a location server 230 that may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
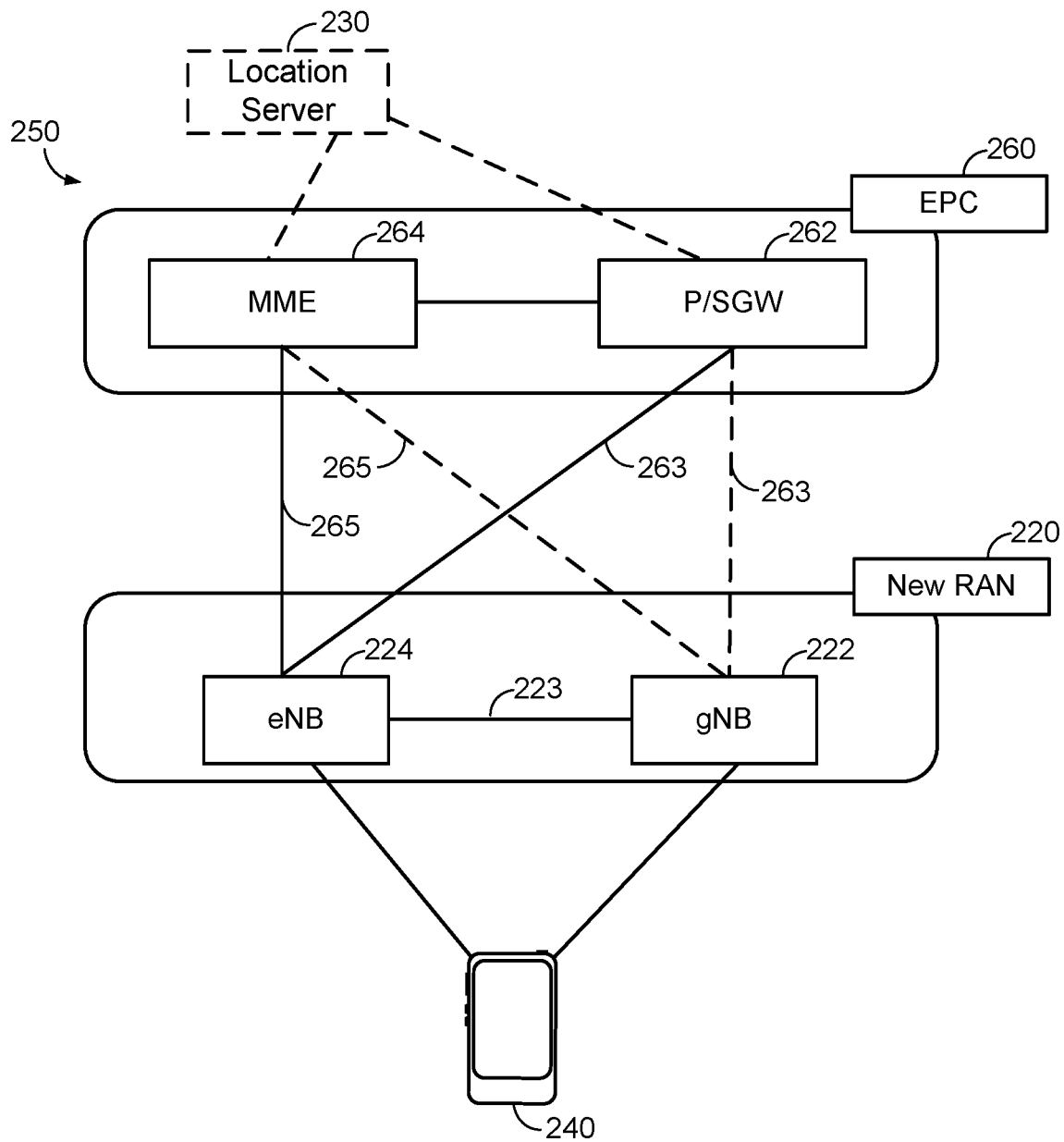

According to various aspects, FIG. 2B illustrates another example wireless network structure 250. For example, EPC 260 can be viewed functionally as control plane functions, Mobility Management Entity (MME) 264 and user plane functions, Packet Data Network Gateway/Serving Gateway (P/SGW) 262, which operate cooperatively to form the core network. S1 user plane interface (S1-U) 263 and S1 control plane interface (S1-MME) 265 connect the eNB 224 to the EPC 260 and specifically to MME 264 and P/SGW 262. In an additional configuration, a gNB 222 may also be connected to the EPC 260 via S1-MME 265 to MME 264 and S1-U 263 to P/SGW 262. Further, eNB 224 may directly communicate to gNB 222 via the backhaul connection 223, with or without gNB direct connectivity to the EPC 260. Accordingly, in some configurations, the New RAN 220 may only have one or more gNBs 222, while other configurations include one or more of both eNBs 224 and gNBs 222. Either gNB 222 or eNB 224 may communicate with UEs 240. Another optional aspect may include the location server 230 that may be in communication with the EPC 260 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, EPC 260, and/or via the Internet (not illustrated).

Figure 3:
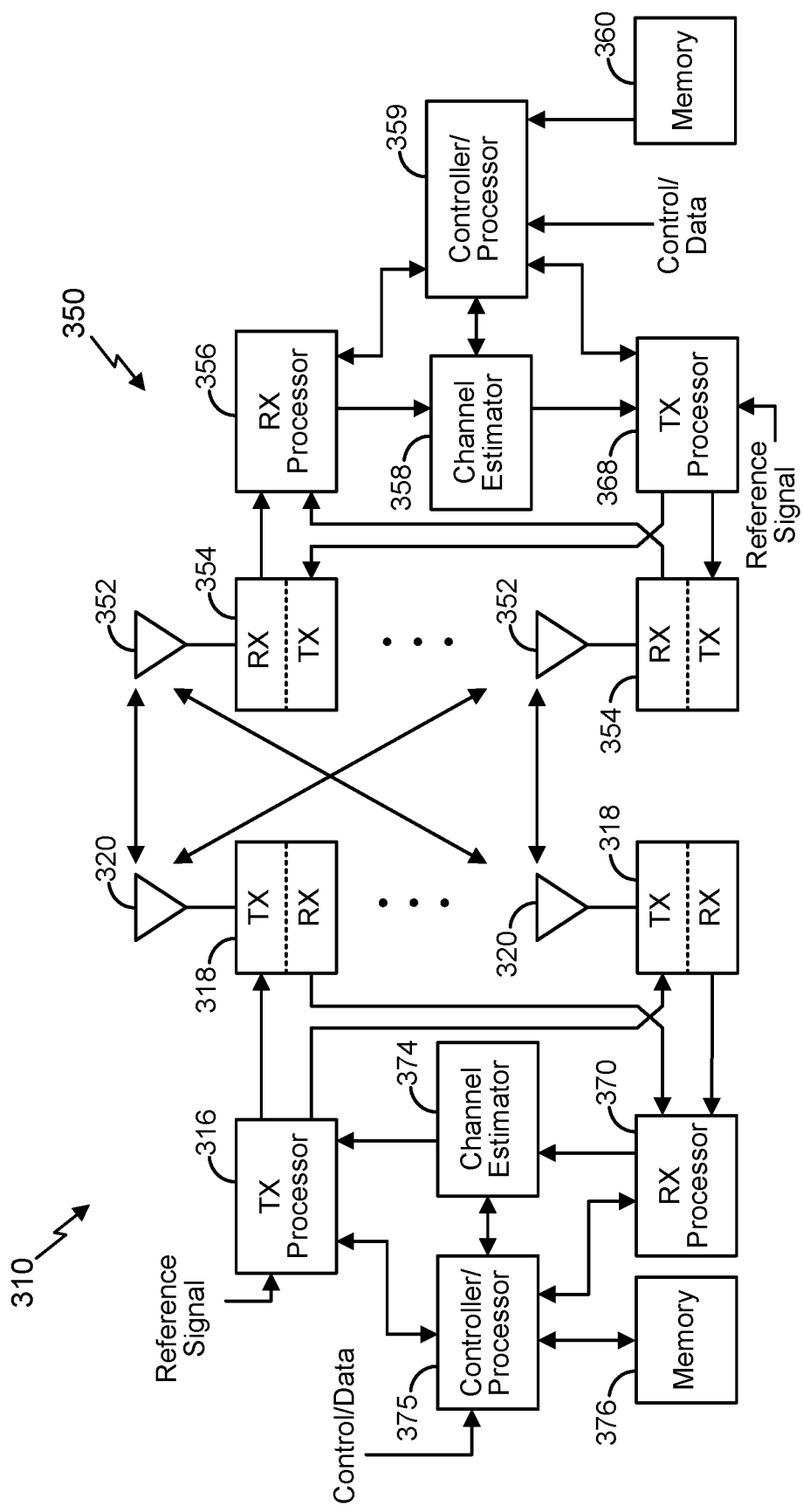
FIG. 3 illustrates an exemplary base station and an exemplary UE in an access network, according to various aspects.

According to various aspects, FIG. 3 illustrates an exemplary base station 310 (e.g., an eNB, a gNB, a small cell AP, a WLAN AP, etc.) in communication with an exemplary UE 350 (e.g., UE 240 or any of the UEs depicted in FIG. 1, such as UEs 104, UE 182, UE 190, etc.) in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE 350 measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through Automatic Repeat Request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an Orthogonal Frequency Division Multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through Hybrid Automatic Repeat Request (HARQ), priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 4:
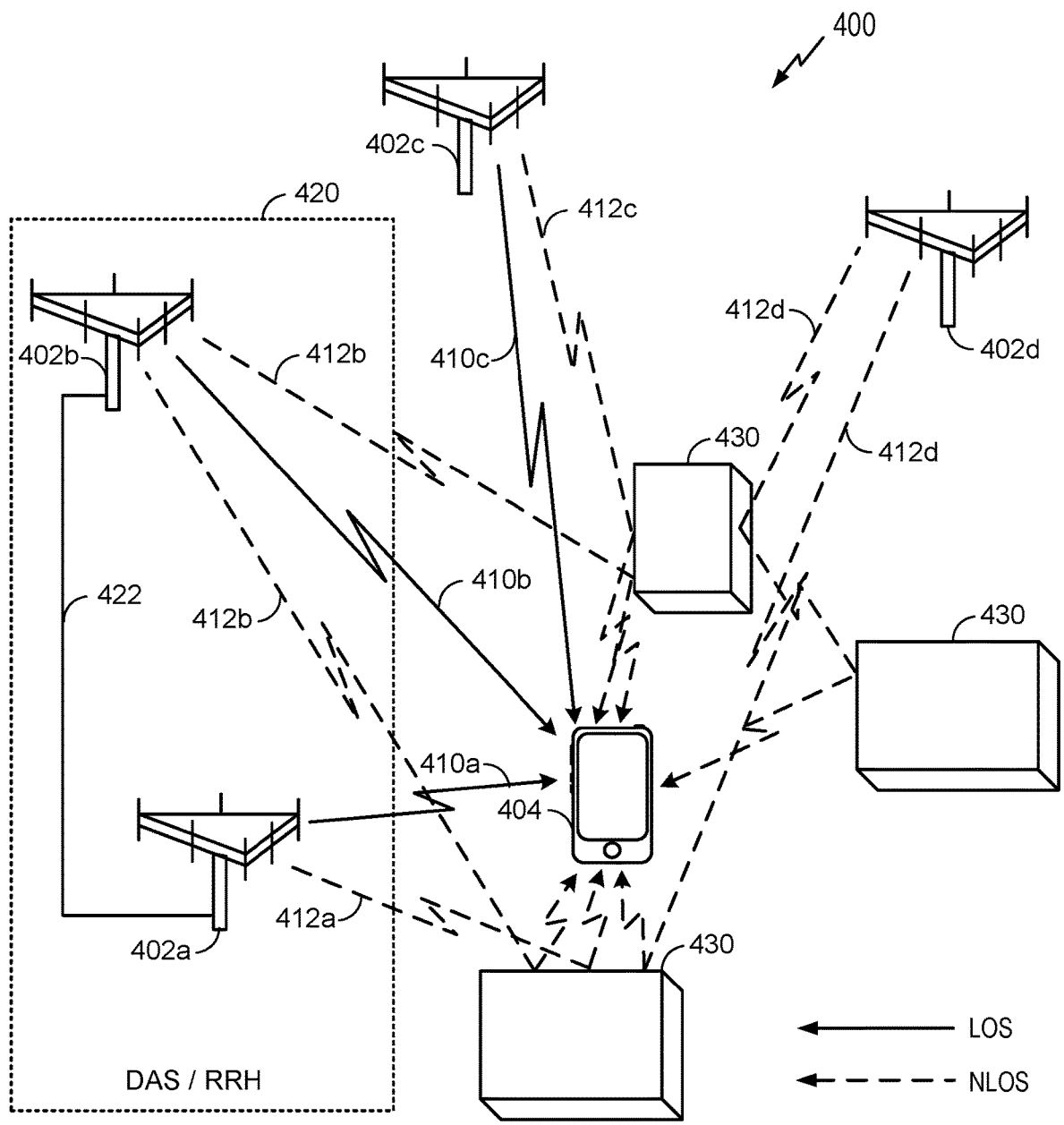
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404, which may correspond to any of the UEs described above with respect to FIGS. 1 to 3 (e.g., UEs 104, UE 182, UE 190, UEs 240, UE 350, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402a-d (collectively, base stations 402), which may correspond to any combination of base stations 102 or 180 and/or WLAN AP 150 in FIG. 1, eNBs 224 and/or gNBs 222 in FIGS. 2A and 2B, and/or base station 310 in FIG. 3, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise time of arrival (ToA) measurements, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of one or more base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna(s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other similar term. The means of obtaining a location estimate may be referred to generically as "positioning," "locating," "position fixing," or the like. A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter (e.g., a base station 402) and receiver (e.g., a UE 404), but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 (in their role as transmitters) and the UE 404 (in its role as receiver). Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

Each LOS path 410 and NLOS path 412 represents the path followed by an RF signal. An "RF signal" comprises an electromagnetic wave that transports information through the space between the transmitter and the receiver. As illustrated in FIG. 4 and as described further below, the receiver (e.g., UE 404) may receive multiple "RF signals" corresponding to each transmitted RF signal due to the propagation characteristics of RF signals through multipath channels. More specifically, when a transmitter (e.g., a base station 402) transmits an RF signal, the RF signal received at the receiver (e.g., UE 404) is the sum or accumulation of the RF signals received over multiple paths. For example, the UE 404 may combine the RF signals received over the LOS path 410c and the NLOS path 412c into a single RF signal. Since signal paths may have different lengths and arrive at the receiver from different directions, as illustrated in FIG. 4, the RF signal from each path is accordingly delayed and arrives at a certain angle. This directional effect is more pronounced at higher frequencies, such as mmW.

In receive beamforming, the receiver uses a receive beam to amplify RF signals detected on a given channel. For example, the receiver can increase the gain setting and/or adjust the phase setting of an array of antennas (e.g., antennas 352 in FIG. 3) in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., RSRP, SINR, etc.) of the RF signals received from that direction.

Figure 5A:
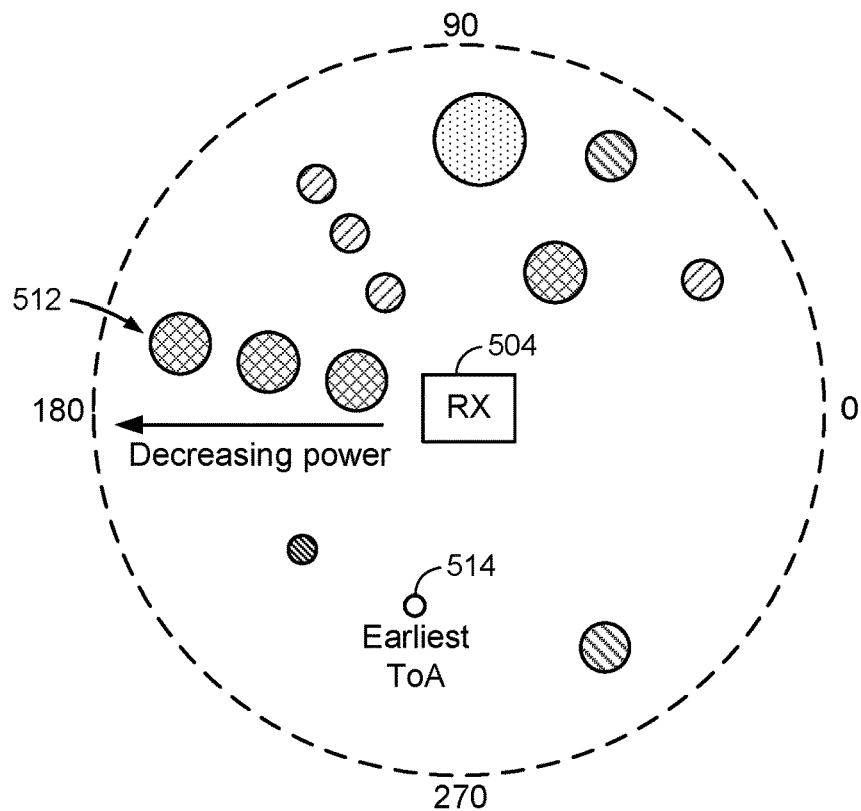
FIGS. 5A and 5B illustrate exemplary representations of a channel between a transmitter and a receiver from the point of view of the receiver, according to various aspects.

FIG. 5A illustrates an exemplary representation of a wireless channel between a transmitter (e.g., a base station 102/310/402 or a UE 104/350/404) and a receiver 504 (e.g., another of a UE 104/350/404 or a base station 102/310/402) from the point of view of the receiver 504, according to aspects of the disclosure. FIG. 5A depicts the relationship between the receiver 504 and a plurality of clusters 512 of a corresponding plurality of RF signals received on the wireless channel. A "cluster" corresponding to an RF signal is formed when the RF signal (i.e., an electromagnetic wave) reflects off of one or more surfaces of one or more objects as it travels from the transmitter to the receiver 504, creating a plurality of reflected electromagnetic rays (the "cluster"). A cluster of reflected electromagnetic rays generally arrives at the receiver 504 from roughly the same angle, each travelling a few wavelengths (e.g., centimeters) more or less than others. As used herein, a "cluster" may also be referred to as a "cluster of RF signals," as each reflected electromagnetic ray is still an RF signal.

In FIG. 5A, each cluster 512 is illustrated as one circle. The angle between a cluster/circle 512 and the receiver 504 indicates the Angle of Arrival (AoA) of that cluster 512 at the receiver 504. The distance between a cluster/circle 512 and the receiver 504 represents the received signal strength of that cluster 512, where a greater distance between the cluster/circle 512 and the receiver 504 indicates a lower received signal strength than a closer distance. The size and shade of a cluster/circle 512 represents the time of arrival at the receiver 504 of that cluster 512, where a smaller size and a darker shade of the cluster/circle 512 indicate an earlier time of arrival than a larger size and a lighter shade.

Thus, in the example of FIG. 5A, cluster 514 (represented as a small black circle) is the earliest arriving cluster, or the cluster with the earliest time of arrival, and is therefore considered to have followed the LOS or shortest path to the receiver 504. However, the weak received signal strength of the cluster 514 (represented by the greater distance between the receiver 504 and the circle) may be due to the RF signals of cluster 514 passing through an obstruction on their way to the receiver 504 or due to reflecting off of a surface that caused greater attenuation at the RF frequency range of the RF signal. In contrast, the cluster in the series of clusters 512 closest to the receiver 504 has the highest received signal strength of the remaining clusters illustrated in FIG. 5A. However, the later time of arrival of the series of clusters 512 (represented by the larger size and lighter shade of the circles) may be due to the RF signals of the series of clusters 512 travelling a longer distance on their way to the receiver 504, for example, by reflecting off of one or more reflective surfaces that caused smaller attenuation at the RF frequency.

As discussed above, in some frequency bands, the shortest path (which may, as noted above, be a LOS path or the shortest NLOS path) may be weaker than an alternative longer (NLOS) path (over which the RF signal arrives later due to propagation delay). Thus, where a receiver uses beamforming to receive RF signals, there may be two or more candidate receive beams from which the receiver can select on which to receive the RF signal. That is, the receiver could direct a receive beam towards the cluster of RF signals having the earliest time of arrival, towards the cluster of RF signals having the highest signal strength, etc. In some cases, especially at higher frequencies, the receive beam of interest for data communication—the receive beam directed towards the strongest RF signals—may be different from the receive beam of interest for position estimation—the beam directed towards the RF signals that excite the shortest detectable path. As such, it would be beneficial for the receiver to select a receive beam based on the type of measurement (e.g., position-related or communications-related) to be performed by the receiver.

Accordingly, in an aspect, a receiver (e.g., a UE, such as any of the UEs depicted in FIGS. 1 to 4) selects a receive beam that is best suited for measuring a reference RF signal based on the type of measurement the receiver will perform on the reference RF signal. For example, if the measurement is a positioning related measurement, and therefore involves estimating the time of arrival of the reference RF signal, the receiver may select a receive beam with a higher gain along the LOS (or shortest NLOS) signal path. Such a receive beam may have high gain in the direction of the AoA of the LOS cluster (e.g., cluster 514). In contrast, if the measurement is a data communications related measurement, such as a measurement of RSRP, Reference Signal Received Quality (RSRQ), SINR, or the like, and therefore involves estimating the beam strength, the receiver may select the receive beam that maximizes beam strength. Such a receive beam may have high gain in the direction of the AoA of the strongest cluster (e.g., series of clusters 512). For example, a beam that maximizes beam strength may be a beam that has a higher gain along the strongest signal path, or a beam that maximizes SINR by having a low gain along a path on which a strong interfering signal is received.

The receiver can determine which receive beam is best suited for performing which type of measurement based on experimenting with different receive beams during previous receptions of reference RF signals (e.g., PRS, CRS, SS, etc.) and performing one or more measurements (e.g., RSRP, ToA, etc.) on the received RF signals. Then, for a subsequent measurement of a reference RF signal, the receiver can reuse the receive beam for the new reference RF signal measurement that was best suited for that type of measurement previously, provided its location and/or environment has not meaningfully changed since the previous measurement. The reference RF signal(s) on which the receiver evaluated different receive beams may be the previous transmission(s) of the same reference RF signal on which the receiver needs to perform the measurement or may be other reference RF signals that are spatially quasi-collocated (QCL) with the reference RF signal on which the receiver needs to perform the measurement. In some cases, especially at higher frequencies, the receive beam best suited for ToA estimation may be different from the receive beam best suited for maximizing RSRP. For example, the receive beam that maximizes the RSRP of the received RF signal would be the one most-suited for performing an RSRP measurement and would be used for that purpose subsequently. As another example, the receive beam that produces the most reliable ToA estimate (e.g., the highest strength of the first detected channel tap) would be selected as the most-suited for performing a ToA measurement and would be selected for that purpose subsequently.

Figure 5B:
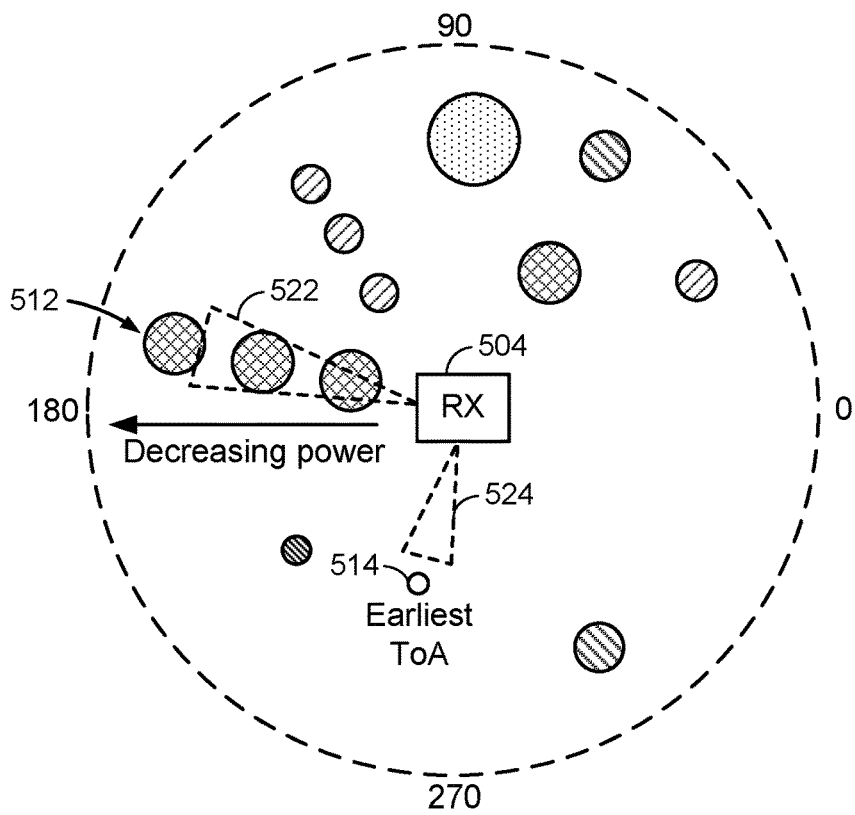

FIG. 5B illustrates an exemplary representation of the wireless channel between a transmitter and the receiver 504 from the point of view of the receiver 504, as in FIG. 5A, according to aspects of the disclosure, and additionally illustrates the beams of interest for positioning and data communications. Specifically, if the receiver 504 is interested in receiving a reference RF signal to maximize RSRP, then it would beamform in the direction (AoA) of the cluster with the highest received signal strength. In the example of FIG. 5B, the direction of the cluster with the highest received signal strength is the AoA of the series of clusters 512 (represented by the short distance between the receiver 504 and the first circle in the series of clusters 512). As such, the receiver 504 would beamform in that direction, as represented by receive beam 522.

In contrast, if the receiver 504 is interested in measuring the time of arrival of the reference RF signal received over the shortest path, which also corresponds to the first detected channel tap, then the receiver 504 would beamform in the direction (AoA) of the cluster corresponding to the shortest path (i.e., the cluster from which a detectable RF signal arrives earlier than from any other cluster). In the example of FIG. 5B, the cluster with the earliest time of arrival is cluster 514 (represented as a small black circle). As such, the receiver 504 would beamform in that direction, as represented by receive beam 524. The receiver 504 can then measure the reference RF signal(s) detected on the selected receive beam.

In some cases, a receiver may need to perform two (or more) different types of measurements, and there may be a different preferred receive beam for each type of measurement. For example, where the receiver needs to perform both a positioning related measurement and a data communications related measurement, the receive beam of interest for the positioning related measurement may be different from the receive beam of interest for the data communications related measurement (as illustrated by receive beams 522 and 524 in FIG. 5B). In such a situation, the receiver may select the receive beam based on a priority associated with the different types of measurements to be performed. The priority may be predetermined or provided to the receiver by the transmitter (e.g., a base station, such as base station 102/310/402) or some other entity (e.g., location server 230). For example, on certain (typically most) transmission occasions, a beam strength measurement may be given a higher priority, whereas on other (typically infrequent, such as every tenth transmission or every 160 ms) transmission occasions, a time of arrival measurement may be given a higher priority.

In addition, in some aspects, the transmitter (or other entity) may inform the receiver which type of measurement to perform ahead of the subsequent transmission of the reference RF signal. This may be beneficial where the transmitter transmits different reference RF signals for different types of measurements at different times. For example, the transmitter may transmit positioning reference RF signals at certain times and data communications reference RF signals at other times. Depending on the type of measurement to be performed, the reference RF signal may be a CSI-RS, signals in the Synchronization Signal (SS) or Physical Broadcast Channel (PBCH) block, PRS in the DL, or Sounding Reference Signals (SRS) or Random Access Channel (RACH) in the UL, or the like.

The current specification of the physical layer of the radio interface for a UE includes the following use cases for SRS on the uplink—codebook, non-codebook, beam management (BM), and antenna switching. In accordance with aspects of the disclosure, a new SRS use case may be defined for "positioning," so that both the base station (e.g., the transmitter) and the UE (e.g., the receiver) are aware that a subsequent reference RF signal is to be used for that purpose. For example, there could be an additional flag in the RRC that indicates that an SRS is to be used for both the conventional purpose (i.e., codebook/non-codebook/BM/antenna switching) and for the new purpose of "positioning."

Similarly, for the downlink, the set of CSI-RS resources that can be used for "positioning" could be associated with a CSI report that has the "positioning" described herein as a value to be reported. It may be beneficial to specify that such a position-specific measurement cannot be configured to occur concurrently with other types of measurements (e.g., Channel Quality Indicator (CQI), Rank Indicator (RI), Precoding Matrix Indicator (PMI), and the like), since positioning-specific CSI-RS resources are not supposed to be used for data communications. However, it may be configured together with the CSI Resource Index (CRI) (another name for the beam index) since the UE may pick which resource has the strongest signal on the shortest/earliest detected path.

Figure 6:
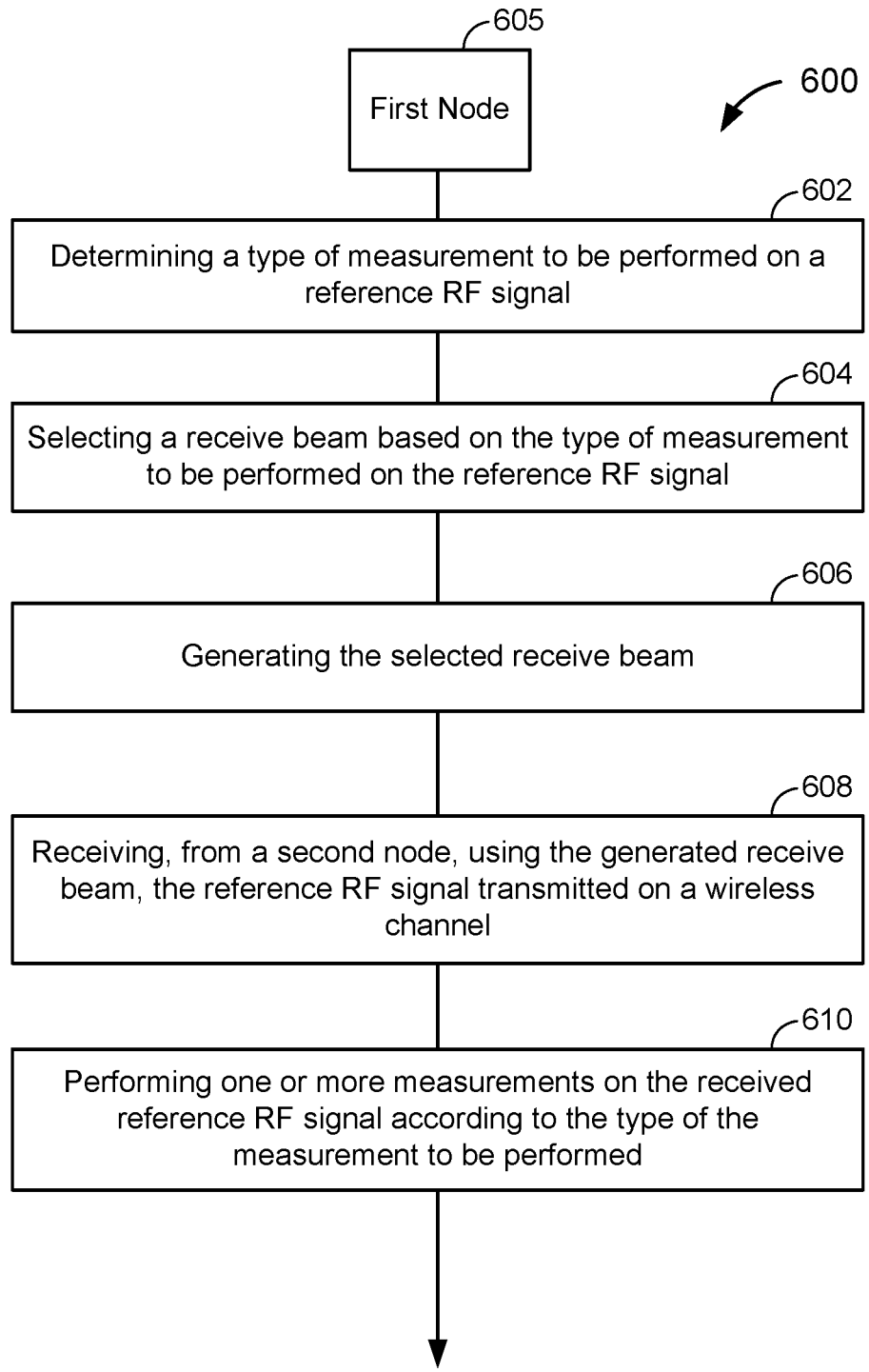
FIG. 6 illustrates an exemplary method, according to various aspects.

FIG. 6 illustrates an exemplary method 600 for receive beam selection for measuring a reference RF signal according to an aspect of the disclosure. The method 600 may be performed by a first node 605 capable of receive beamforming, such as a base station 310 or UE 350. At 602, the first node 605 (e.g., RX processor 370 and/or controller/processor 375, or RX processor 356 and/or controller/processor 359) determines a type of measurement (e.g., for positioning or data communications) to be performed on a reference RF signal. As discussed above, in an aspect, the first node 605 may receive the type of the measurement to be performed from a second node (e.g., the other of base station 310 or UE 350) that will be transmitting the reference RF signal.

At 604, the first node 605 (e.g., RX processor 370 and/or controller/processor 375, or RX processor 356 and/or controller/processor 359) selects a receive beam based on the type of measurement to be performed on the reference RF signal. As discussed briefly above, the first node 605 can determine which receive beam is best suited for performing which type of measurement based on experimenting with different receive beams during previous transmissions of the reference RF signal to be measured and evaluating the measurements of the resulting received reference RF signals. The first node 605 can also evaluate different receive beams on other reference RF signals that are spatially quasi-collocated with the reference RF signal on which the first node 605 needs to perform the measurement. Thus, in an aspect, during a previous reception of a reference RF signal, the first node 605 may have used a plurality of different candidate receive beams to receive the reference RF signal, and then determined which of those receive beams provided the best result for a given type of measurement to be performed on the reference RF signal (e.g., ToA, RSRP, etc.). For example, if the type of measurement is a ToA measurement, the receive beam that produces the most reliable ToA estimate (e.g., the highest received signal strength of the first detected channel tap) would be selected as the most-suited for performing a ToA measurement. For example, this may be the receive beam 524 that points along the AoA of the shortest detected radio path, as illustrated in FIG. 5B. As another example, if the type of measurement is an RSRP measurement, the receive beam that maximizes the RSRP of the received reference RF signal would be the one most-suited for performing an RSRP measurement and would be used for that purpose. For example, this may be the receive beam 522 that points along the AoA of the strongest detected radio path, as illustrated in FIG. 5B.

In an aspect, the previously received reference RF signal may be a previous transmission of the current reference RF signal to be measured, or a reference RF signal transmitted using the same transmit beam as the reference RF signal to be measured. That is, the previous reference RF signal and the reference RF signal to be measured may be spatially quasi collocated.

At 606, the first node 605 (e.g., antenna(s) 320, receiver(s) 318RX, and/or RX processor 370, or antenna(s) 352, receiver(s) 354RX, and/or RX processor 356) generates the receive beam selected at 604. As discussed above, if the measurement is a positioning-related measurement, the generated receive beam may have high gain in the direction of the AoA of the LOS cluster (e.g., cluster 514). In contrast, if the measurement is a data communications related measurement, such as a measurement of RSRP, and therefore involves estimating the beam strength, the generated receive beam may have high gain in the direction of the AoA of the strongest cluster (e.g., series of clusters 512), or a low gain along a path on which a strong interfering signal is received.

In some cases, as noted above, the first node 605 may need to perform two (or more) different types of measurements, and there may be a different preferred receive beam for each type of measurement. For example, where the first node 605 needs to perform both a positioning related measurement and a data communications related measurement, because an RF signal received along the shortest path (good for positioning) may be weaker than an alternative stronger RF signal received along a longer path (good for data communications), the RF signal for the positioning related measurement may be different from the cluster for the data communications related measurement. In such a situation, the first node 605 may generate a receive beam based on a priority associated with the different types of measurements to be performed. That is, the first node 605 may generate the receive beam that would strengthen the RF signal appropriate for the type of measurement that has the higher (or highest) priority. For example, on certain (typically most) transmission occasions, a beam strength measurement may be given a higher priority, whereas on other (typically infrequent, such as every tenth transmission or every 160 ms) transmission occasions, a time of arrival measurement may be given a higher priority. In an aspect, the priority may have been provided to the first node 605 by the second node.

In some cases, the first node 605 may need to perform two (or more) different types of measurements, and the same receive beam may be preferred for each type of measurement. For example, where the type of measurements to be performed are a positioning measurement and a data communications measurement and the shortest path (e.g., LOS) RF signal is also the strongest RF signal, the first node 605 can use that receive beam for both the positioning measurement and a data communications measurement. As such, there would be no need to consider the priority of the type of measurement, even if available.

At 608, the first node 605 (e.g., antenna(s) 320, receiver(s) 318RX, and/or RX processor 370, or antenna(s) 352, receiver(s) 354RX, and/or RX processor 356) receives, from the second node, using the receive beam generated at 606, the reference RF signal transmitted on a wireless channel. At 610, the first node 605 (e.g., RX processor 370 and/or controller/processor 375, or RX processor 356 and/or controller/processor 359, in conjunction with the antenna(s) 320 and/or receiver(s) 318RX, or antenna(s) 352 and/or receiver(s) 354RX, respectively) performs one or more measurements on the reference RF signal received at 608 according to the type of the measurement to be performed.

Typically, the first node 605 determines a receive beam before actually receiving an RF signal. That is, the RF signal is received using a receive beam. However, if the first node 605 utilizes all-digital beamforming (where the received RF signal on each antenna element is digitized and stored), then the first node 605 could receive the RF signal on each antenna element and determine a receive beam (i.e., how to combine the received RF signal from each antenna element) subsequently.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for receive beam selection for measuring a reference radio frequency (RF) signal, comprising:
   receiving, by a first node from a second node, a type of measurement to be performed on the reference RF signal;
   receiving, at the first node from the second node, the reference RF signal transmitted on a wireless channel;
   selecting, by the first node, a receive beam on which to receive the reference RF signal based on the type of measurement to be performed on the reference RF signal; and
   performing, by the first node, one or more measurements on the received reference RF signal according to the type of the measurement to be performed.

2. The method of claim 1, wherein the first node selects the receive beam for performing the measurement of the reference RF signal based on a priority of the type of measurement to be performed.

3. The method of claim 2, wherein the first node selects a second receive beam for performing a second measurement of a second reference RF signal based on a type of the second measurement to be performed on the second reference RF signal.

4. The method of claim 3, wherein the first node selects the second receive beam for performing the second measurement of the second reference RF signal based on a priority of the type of the second measurement to be performed on the second reference RF signal.

5. The method of claim 4, wherein the first node measures the received reference RF signal using the selected receive beam before the first node measures the second reference RF signal using the second receive beam based on the priority of the type of the measurement being higher than the priority of the type of the second measurement.

6. The method of claim 5, wherein the type of the measurement is a data communications measurement, and wherein the type of the second measurement is a positioning measurement.

7. The method of claim 3, wherein the second receive beam and the selected receive beam are the same receive beam.

8. The method of claim 7, wherein the selected receive beam comprises a receive beam having a higher gain along a shortest RF signal path between the second node and the first node than remaining receive beams along the shortest RF signal path and that maximizes beam strength.

9. The method of claim 2, wherein the first node receives the priority of the type of the measurement from the second node.

10. The method of claim 1, wherein the selecting comprises:
generating, by the first node, a plurality of receive beams, including the selected receive beam, in a corresponding plurality of directions;
receiving, at the first node, a second reference RF signal on one or more of the plurality of receive beams;
determining, by the first node, at least one receive beam of the plurality of receive beams that provides the best result for the type of measurement of the second reference RF signal; and
selecting, by the first node, the at least one receive beam as the selected receive beam.

11. The method of claim 10, wherein the second reference RF signal comprises a previous transmission of the reference RF signal to be measured.

12. The method of claim 10, wherein the second reference RF signal comprises a reference RF signal transmitted using the same transmit beam as the reference RF signal to be measured.

13. The method of claim 1, wherein the type of the measurement is a positioning measurement, and wherein the selected receive beam comprises a receive beam having a higher gain along a shortest RF signal path between the second node and the first node than remaining receive beams.

14. The method of claim 13, wherein the type of the measurement is a time of arrival measurement of the reference RF signal.

15. The method of claim 1, wherein the type of the measurement is a data communications measurement, and wherein the selected receive beam comprises a receive beam that maximizes beam strength.

16. The method of claim 15, wherein the type of the measurement is a received signal strength measurement.

17. The method of claim 15, wherein the receive beam that maximizes beam strength comprises a receive beam that has a higher gain along a strongest RF signal path between the second node and the first node, or a receive beam that has a low gain along an RF signal path on which a strong interfering signal is received at the first node.

18. The method of claim 1, wherein the first node is a user equipment and the second node is a base station or an antenna or antenna array of the base station.

19. The method of claim 1, wherein the first node is a base station or an antenna or antenna array of the base station and the second node is a user equipment.

20. An apparatus for receive beam selection for measuring a reference radio frequency (RF) signal, comprising:
a receiver of a first node; and
at least one processor of the first node, the at least one processor configured to:
receive, from a second node via the receiver, a type of measurement to be performed on the reference RF signal; and
receive, from the second node via the receiver, the reference RF signal transmitted on a wireless channel;
select a receive beam on which to receive the reference RF signal based on the type of measurement to be performed on the reference RF signal; and
perform one or more measurements on the received reference RF signal according to the type of the measurement to be performed.

21. The apparatus of claim 20, wherein the at least one processor being configured to select comprises the at least one processor being configured to select the receive beam for performing the measurement of the reference RF signal based on a priority of the type of the measurement to be performed.

22. The apparatus of claim 21, wherein the first node selects a second receive beam for performing a second measurement of a second reference RF signal based on a type of the second measurement to be performed on the second reference RF signal.

23. The apparatus of claim 22, wherein the first node selects the second receive beam for performing the second measurement of the second reference RF signal based on a priority of the type of the second measurement to be performed on the second reference RF signal.

24. The apparatus of claim 23, wherein the first node measures the received reference RF signal using the receive beam before the first node measures the second reference RF signal using the second receive beam based on the priority of the type of the measurement being higher than the priority of the type of the second measurement.

25. The apparatus of claim 24, wherein the type of the measurement is a data communications measurement, and wherein the type of the second measurement is a positioning measurement.

26. The apparatus of claim 21, wherein the second receive beam and the receive beam are the same receive beam.

27. The apparatus of claim 26, wherein the receive beam comprises a receive beam having a higher gain along a shortest RF signal path between the second node and the first node than remaining receive beams along the shortest RF signal path and that maximizes beam strength.

28. The apparatus of claim 21, wherein the first node receives the priority of the type of the measurement from the second node.

29. The apparatus of claim 20, wherein the at least one processor being configured to select comprises the at least one processor being configured to:
generate a plurality of receive beams, including the selected receive beam, in a corresponding plurality of directions;
receive a second reference RF signal on one or more of the plurality of receive beams;
determine at least one receive beam of the plurality of receive beams that provides the best result for the type of measurement of the second reference RF signal; and
select the at least one receive beam as the selected receive beam.

30. The apparatus of claim 29, wherein the second reference RF signal comprises a previous transmission of the reference RF signal to be measured.

31. The apparatus of claim 29, wherein the second reference RF signal comprises a reference RF signal transmitted using the same transmit beam as the reference RF signal to be measured.

32. The apparatus of claim 20, wherein the type of the measurement is a positioning measurement, and wherein the selected receive beam comprises a receive beam having a higher gain along a shortest RF signal path between the second node and the first node than remaining receive beams.

33. The apparatus of claim 32, wherein the type of the measurement is a time of arrival measurement of the reference RF signal.

34. The apparatus of claim 20, wherein the type of the measurement is a data communications measurement, and wherein the selected receive beam comprises a receive beam that maximizes beam strength.

35. The apparatus of claim 34, wherein the type of the measurement is a received signal strength measurement.

36. The apparatus of claim 34, wherein the receive beam that maximizes beam strength comprises a receive beam that has a higher gain along a strongest RF signal path between the second node and the first node, or a receive beam that has a low gain along an RF signal path on which a strong interfering signal is received at the first node.

37. The apparatus of claim 20, wherein the first node is a user equipment and the second node is a base station or an antenna or antenna array of the base station.

38. The apparatus of claim 20, wherein the first node is a base station or an antenna or antenna array of the base station and the second node is a user equipment.

39. An apparatus for receive beam selection for measuring a reference radio frequency (RF) signal, comprising:
- means for receiving, from a transmitter node, a type of measurement to be performed on the reference RF signal;
- means for receiving, from the transmitter node, the reference RF signal transmitted on a wireless channel;
- means for selecting a receive beam on which to receive the reference RF signal based on the type of measurement to be performed on the reference RF signal; and
- means for performing one or more measurements on the received reference RF signal according to the type of the measurement to be performed.

40. A non-transitory computer-readable medium storing computer-executable instructions for receive beam selection for measuring a reference radio frequency (RF) signal, the computer-executable instructions comprising:
- at least one instruction instructing a first node to receive, from a second node, a type of measurement to be performed on the reference RF signal;
- at least one instruction instructing the first node to receive, from the second node, the reference RF signal transmitted on a wireless channel;
- at least one instruction instructing the first node to select a receive beam on which to receive the reference RF signal based on the type of measurement to be performed on the reference RF signal; and
- at least one instruction instructing the first node to perform one or more measurements on the received reference RF signal according to the type of the measurement to be performed.

* * * * *